(12) United States Patent
Mukherjee et al.

(10) Patent No.: US 8,230,263 B2
(45) Date of Patent: Jul. 24, 2012

(54) AUTOMATED SPECIFICATION BASED FUNCTIONAL TEST GENERATION INFRASTRUCTURE

(75) Inventors: Debaditya Mukherjee, San Carlos, CA (US); Anil Raj Gopalakrishnan, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 773 days.

(21) Appl. No.: 12/212,736

(22) Filed: Sep. 18, 2008

(65) Prior Publication Data

US 2009/0235121 A1  Sep. 17, 2009

Related U.S. Application Data

(60) Provisional application No. 60/973,550, filed on Sep. 19, 2007.

(51) Int. Cl.
  *G06F 11/00* (2006.01)
  *G06F 17/50* (2006.01)
(52) U.S. Cl. ............... 714/33; 714/32; 714/25; 716/136
(58) Field of Classification Search .................... 714/33, 714/32, 25; 716/136
See application file for complete search history.

(56) References Cited

U.S. PATENT DOCUMENTS

| | | | | |
|---|---|---|---|---|
| 5,604,895 A * | 2/1997 | Raimi | ............... | 703/13 |
| 5,724,504 A * | 3/1998 | Aharon et al. | ............... | 714/33 |
| 5,903,475 A * | 5/1999 | Gupte et al. | ............... | 703/16 |
| 5,960,171 A * | 9/1999 | Rotman et al. | ............... | 714/49 |
| 6,523,151 B2 * | 2/2003 | Hekmatpour | ............... | 716/106 |
| 6,647,513 B1 * | 11/2003 | Hekmatpour | ............... | 714/37 |
| 6,701,515 B1 * | 3/2004 | Wilson et al. | ............... | 717/117 |
| 6,715,134 B2 * | 3/2004 | Chang et al. | ............... | 716/106 |
| 6,857,110 B1 * | 2/2005 | Rupp et al. | ............... | 716/136 |
| 6,885,983 B1 * | 4/2005 | Ho et al. | ............... | 703/14 |
| 7,065,719 B2 * | 6/2006 | Nakajima | ............... | 716/104 |
| 7,366,951 B2 * | 4/2008 | Fallah et al. | ............... | 714/33 |
| 7,673,261 B2 * | 3/2010 | Adir et al. | ............... | 716/106 |
| 7,945,894 B2 * | 5/2011 | Peck et al. | ............... | 717/109 |
| 2005/0022058 A1 * | 1/2005 | Fechser | ............... | 714/33 |
| 2006/0143588 A1 * | 6/2006 | Sha et al. | ............... | 716/18 |

* cited by examiner

*Primary Examiner* — Joseph Schell
(74) *Attorney, Agent, or Firm* — Christopher P. Maiorana, PC (57) ABSTRACT

A method comprising the steps of (A) generating a code, (B) applying one or more constraint constructs to the code, (C) generating a coverage code and a second code in response to applying the constraint constructs to the code, (D) generating a third code in response to the code, and (E) generating one or more assembly language tests in response to the second code.

18 Claims, 6 Drawing Sheets

AUTOMATED SPECIFICATION BASED FUNCTIONAL TEST GENERATION INFRASTRUCTURE

This application claims the benefit of U.S. Provisional Application No. 60/973,550, filed Sep. 19, 2007 and is hereby incorporated by reference in its entirety.

FIELD OF THE INVENTION

The present invention relates to testing generally and, more particularly, to a method and/or apparatus for implementing an automated specification based functional test generation infrastructure.

BACKGROUND OF THE INVENTION

A large number of architecturally visible registers are used in Image/Video processing blocks to configure various parameters. Each register can have a multitude of fields. Complex relationships often exist between these fields. These relationships need to be maintained when programming registers. Constraints or relationships are specified in the architecture specification. Designers/verification engineers, as well as application developers, need to adequately understand these constraints to correctly operate the hardware. Writing test cases by hand (especially when using assembly code) is time consuming and error prone. Test generators have been written that employ Perl or C code. However, it is very difficult to solve a large number of constraints efficiently. This leads to many lines of custom code being written for the generator.

It would be desirable to implement an automated specification based functional test generation infrastructure.

SUMMARY OF THE INVENTION

The present invention concerns a method comprising the steps of (A) generating a code, (B) applying one or more constraint constructs to the code, (C) generating a coverage code and a second code in response to applying the constraint constructs to the code, (D) generating a third code in response to the code, and (E) generating one or more assembly language tests in response to the second code.

The objects, features and advantages of the present invention include providing an automated specification based functional test generation infrastructure that may (i) provide constraint solving, (ii) provide an efficient system, (iii) provide a high degree of programmability, (iv) generate a variety of codes used for testing, and/or (v) provide information useful to other design phases.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a test generation infrastructure that may generate System Verilog (SV) code from register information embedded in architectural specifications. Advanced constraint constructs available in System Verilog may be employed. Constraint solvers may also be employed to efficiently generate assembly language tests. In addition, the framework of the present invention may also generate coverage and C code that may provide a basis for functional coverage and reference modeling.

Verification of any module or sub-module is normally partitioned into three phases (1) bring-up, (2) feature testing, and (3) pseudo-random testing. Bring-up tests are used for first ensuring RTL functionality of a new module/sub-module. The first bring-up test is normally a "pass-through" test. The pass-through test is indented to verify correct hookup of the major data paths of a module. Additional bring-up tests are included that turn on one sub-module at a time. Bring-up tests are the simplest directed tests. At the end of the bring-up tests, the verification process transitions to feature testing. Feature tests are also directed tests and cover major and minor functional modes of the module. The test plan for feature testing is typically derived from a rigorous evaluation of register field definitions in the architecture specs. The test plan documents all major features, with each major feature being partitioned into minor features. The boundary between feature testing and pseudo-random testing is somewhat fuzzy. The number of feature tests is typically small. Even if a module/sub-module has a large number of programmable registers, only a small subset are "control" registers that define the modes of operation of the module. The prevailing bug-rate determines when to switch from directed to pseudo-random testing (e.g., normally after the bug-rate tapes off).

A divide-and-conquer approach may also be used for tackling large intractable problems, such as hardware verification. In order to verify sub-modules and modules, sub-module or module level test-benches may be implemented to obtain a high degree of controllability. This approach leads to a proliferation of test benches. A preferred approach is to identify transparency modes to and from the target sub-module and then apply the full suite of verification module tests at a higher level testbench. In simulation, comparison with a reference model may be done at any level of the hierarchy. There is a tradeoff between very fine grain comparison (at multiple points of the pipe versus module or chip outputs) and simulation overhead and test bench complexity. Therefore transparency paths need to be set up to compare points.

Constraint solving is normally a non-deterministic polynomial time (NP) problem. NP-complete problems are generally a class of related problems in computer science. NP-complete problems may be checked on a computer. If one of the problems may be solved, then all of the problems may be solved. Solvers normally need to be memory and run-time efficient. Solver engines normally fall into either of two categories—compiled or runtime. The solvers from major software vendors (e.g., Synopsys, Cadence (Verisity), Mentor, etc.) are normally compiled solvers. Run-time solvers heuristically determine random solutions during simulation (e.g., ATPG or SAT based). The underlying solver engine algorithms from major vendors are normally held as closely guarded secrets.

To minimize the time needed to implement the 3 phase approach and/or the divide and conquer approach, a library of "macros" may be implemented to specify various functional modes of modules and sub-modules. A transparency mode may be one of the key macros. If the library of macros may be limited to complete specifications of register values, then any existing technique may be employed. For example, a limited macro library already used for writing/generating assembly language tests may be extended. With System Verilog, a constraint which specifies a set of relationships between fields for the targeted module sub-module may be defined. A library of constraint definitions may be implemented that may be selectively turned off or on. Then all the constraints may be solved simultaneously. The constraint solver may provide an assignment of values for fields satisfying the specified constraints.

Figure 1:
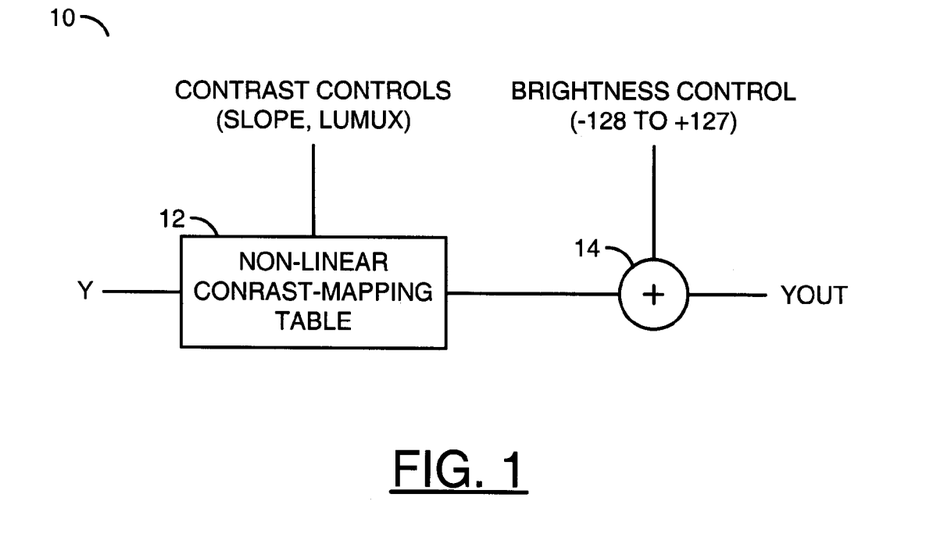
FIG. 1 is a block diagram illustrating a HSBC sub-module in a main video pipe.

Referring to FIG. 1, a diagram of the system 10 (e.g., a hue, saturation, brightness and contrast (HSBC) sub-module in the main video pipe) is shown. The system 10 generally comprises a block (or circuit) 12 and a block (or circuit) 14. The block 12 may be implemented as a non-linear contrast-mapping table. The block 14 may be implemented as an adder circuit. The block 12 may implement contrast controls (e.g., slope, lumux). The adder circuit 14 may implement brightness controls (e.g., −128 to +128). Brightness and contrast may modify the Luma (Y) component of the pixels.

Figure 2:
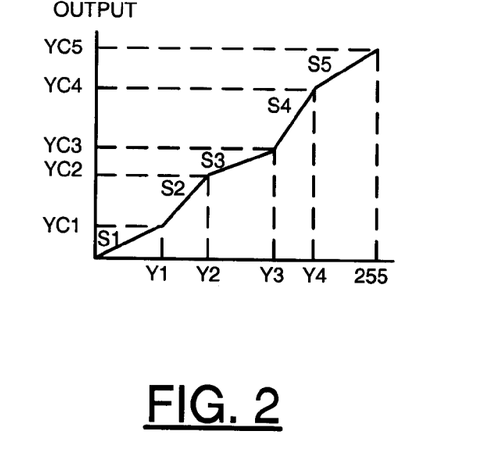
FIG. 2 is a line graph illustrating the contrast mapping function.

Referring to FIG. 2, a line graph illustrating a contrast mapping function is shown. A five section piece-wise linear function may be used to change the luma value (i.e., contrast). Nine values (i.e., five slopes and four intermediate luma values) may be stored in the registers to completely define the contrast mapping function. The four intermediate luma values (e.g., Y1, . . . , Y4) and the five slopes (e.g., S1, . . . , S5) may be the nine variables that are programmed and represented as a constraint set as follows:

---
Constraint vout_vid_hscb_contrast {
YC1 = 0 + S1 * Y1
YC2 = YC1 + S2 * (Y2−Y1)
YC3 = YC2 + S3 * (Y3−Y2)
YC4 = YC3 + S4 * (Y4−Y3)
YC5 = YC4 + S5 * (255 − Y4)
0 < Y1 < Y2 < Y3 < Y4 < 255 }
---

Constraint solving may involve more than verification. Constraint solving may be employed in a multitude of industries for a varied set of problems such as scheduling, routing and work assignment. For example, constraint solving may be used for finding an optimal solution to a problem. A number of companies provide generalized constraint solvers (e.g., ILOG (ilog.com), Cosytec (cosytec.com), Sicstus (sics.se), and Dash (dashoptimization.com)).

The constraint solving problem for functional test generation may be outlined as follows. Consider a set of variables ($V=\{v_1, v_2, \ldots, v_n\}$) and a set of constraints ($C=\{c_1, c_2, \ldots, c_n\}$). The variables V may be random or state. The variables V may also have a predefined precision and sign. The constraints C may be a relation between expressions over a subset of the variables V. For particular values of the variables V in state, assignments may be found for all random variables V, such that all the constraints C are satisfied. A constraint solver engine for chip designs normally needs to perform the following aspects (a) produce good distributions of multiple random solutions, (b) deal with a large number of complex inter-related constraints, (c) support a wide variety of operators and language constructs, (d) deal with large bit widths, and/or (e) high performance and capacity.

Figure 3:
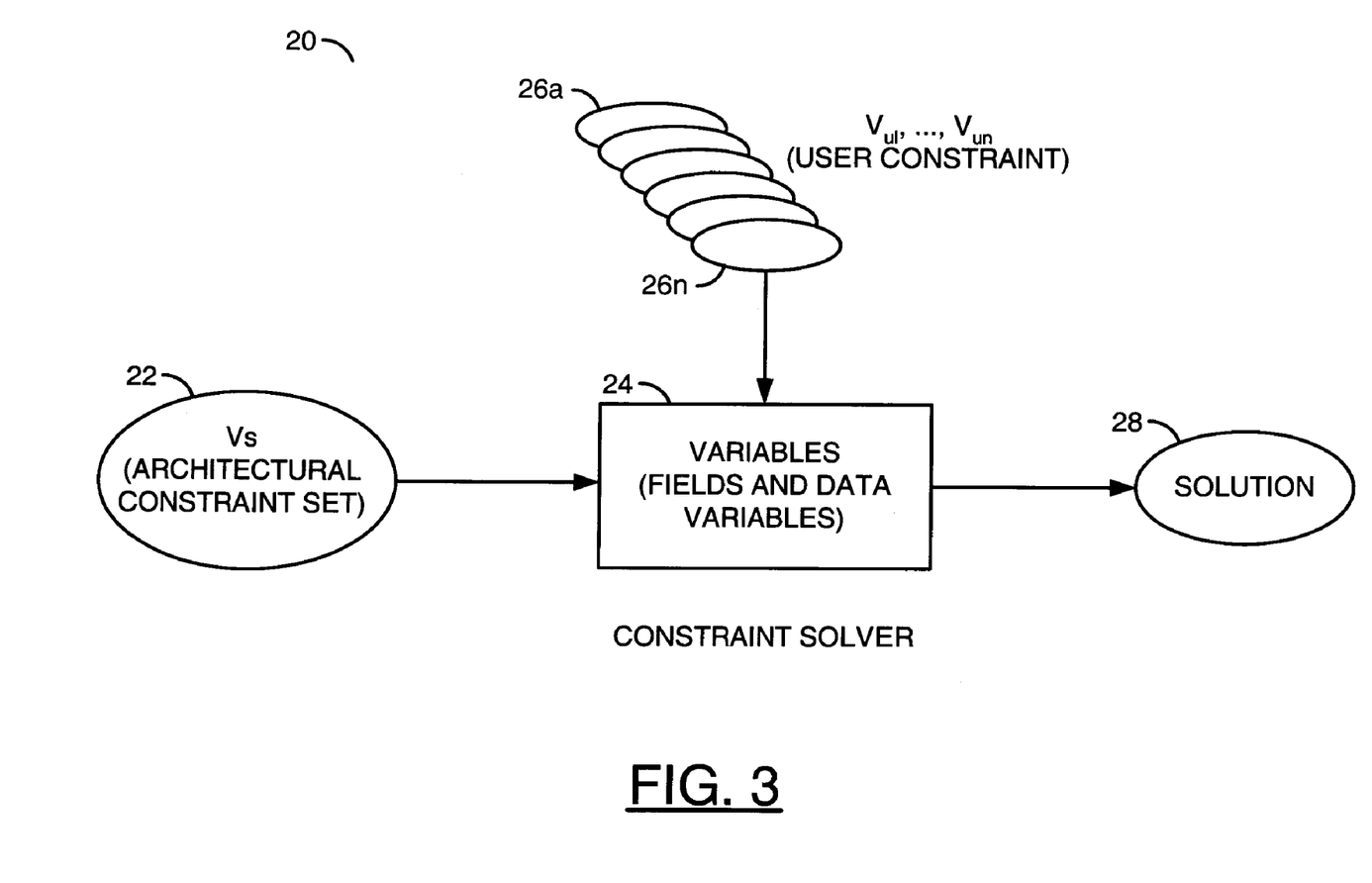
FIG. 3 is a block diagram illustrating a constraint solver.

Referring to FIG. 3, a diagram of the system 20 is shown. The system 20 may be implemented as a constraint solver. The constraint solver 20 generally comprises a constraint set 22, a block (or circuit) 24, a set of constraints 26a-26n, and a solution 28. The constraint set 22 may be implemented as a architectural constraint set. The block 24 may be implemented as a set of variables (e.g., fields and data variables). The set of constraints 26a-26n may be implemented as a set of user constraints (e.g., Vui-Vun). The solution 28 may be implemented as a solution to the constraint solver 20.

An architecture document may specify a relationship between a set of register fields (and also the external environment) that may be satisfied for correct operation of the hardware. In one example, the architecture specification may specify the relationships in precise mathematical terms. Generally, the relationships are specified in English text throughout the architecture specification. Verification engineers normally translate the relationships into constraints. In an example device (e.g., a digital video subsystem) the architectural constraints may be captured for each sub-module as "basic constraints". Random tests may be generated by finding solutions that meet the basic constraints. For feature testing and directed random testing, user constraints may often be added.

In System Verilog, the syntax for constraint specification is "C" like. Some operators (e.g., =>) may be translated into OR operators. For example, a=>b may be written as (!a)|b. The basic constraints (if written in separate files) may be used as checkers to check programming when tests are written by hand or generated by tools that may not perform constraint solving. Checking the validity of application tests written by software or applications teams may be a key application, since there may be a misinterpretation of the specifications.

The lowest level of granularity in a design may be the sub-module. The sub-module is an atomic entity from a design perspective. The layout may not match the same level of granularity. The registers of each sub-module may be grouped into a "register file" from a verification perspective. For example, a module may include multiple sub-modules and correspondingly contains multiple register files. Verification of all of the functions in a sub-module may keep the other sub-modules in a "transparent or minimal transform" mode. In one example, an extreme form of transparency may be the "bypass" mode. In the bypass mode the data may be passed unchanged from input to output. Many of the sub-modules in the video subsystem (e.g., video input, video 3-dimensional and video output) may have the bypass mode. The test generation system of the present invention may provide the ability to specify functional modes of various sub-modules and modules in a chip.

Figure 4:
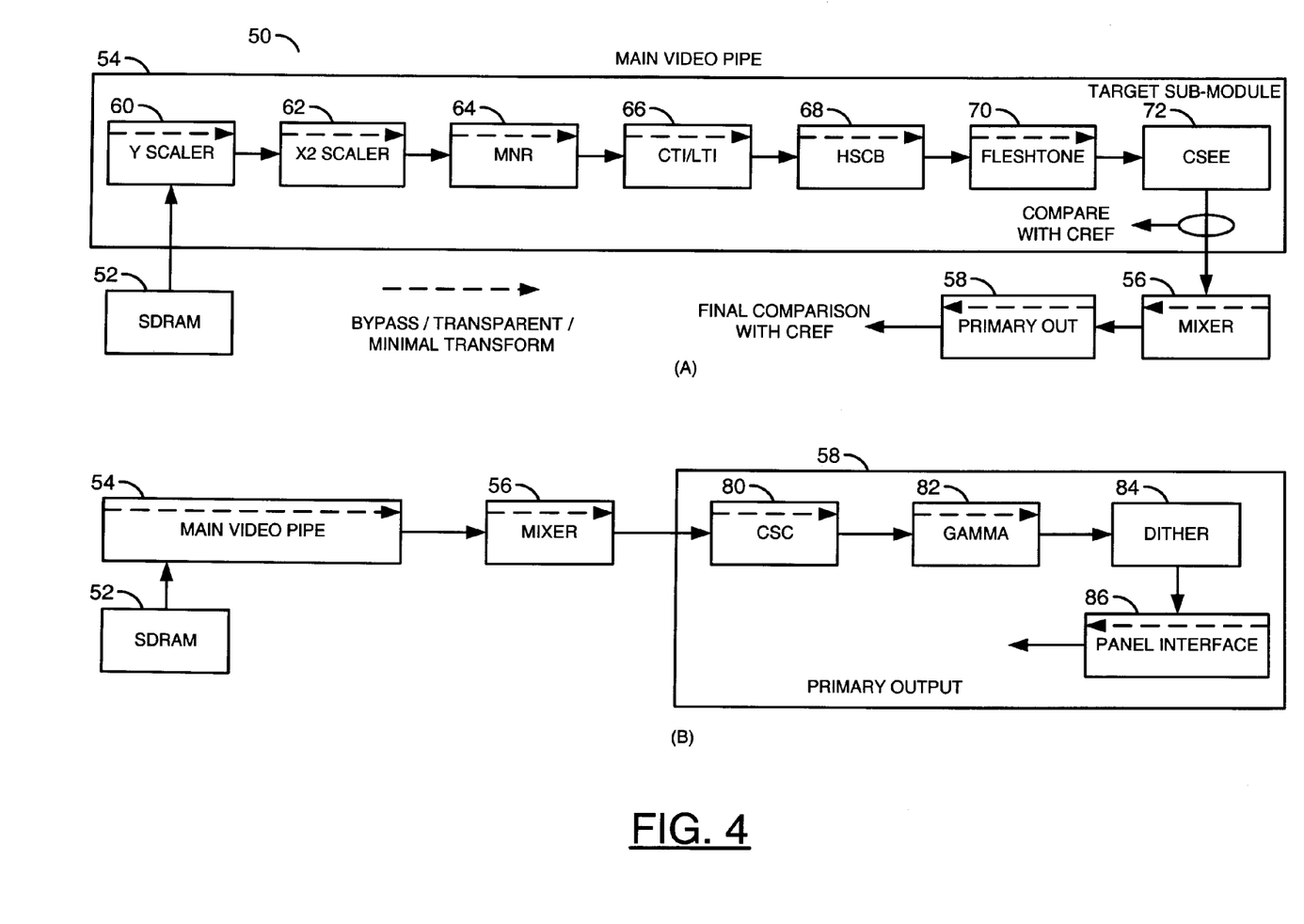
FIG. 4 is a block diagram illustrating the verification of a CSEE sub-block in the main video pipe.

Referring to FIG. 4, a diagram of the system 50 is shown. FIG. 4(a) may be a conceptual representation of verification of the CSEE sub-block in the main video pipe of VOUT. The system 50 generally comprises a block (or circuit) 52, a block (or circuit) 54, a block (or circuit) 56, and a block (or circuit) 58. The block 54 may be implemented as a SDRAM. The block 54 may be implemented as a main video pipe. The block 56 may be implemented as a mixer. The block 58 may be implemented as a primary output. The main video pipe 54 generally comprises a block (or circuit) 60, a block (or circuit) 62, a block (or circuit) 64, a block (or circuit) 68, a block (or circuit) 70, and a block (or circuit) 72. The block 60 may be implemented as a Y scaler circuit. The block 62 may be implemented as a X2 scaler circuit. The block 64 may be implemented as a MNR circuit. The block 66 may be implemented as a CTI/LTI circuit. The block 68 may be implemented as a hue, saturation, contrast and brightness circuit (e.g., HSCB). The block 70 may be implemented as a fleshtone circuit. The block 72 may be implemented as a CSEE circuit.

Referring to FIG. 4(b), an alternate conceptual representation of the CSEE sub-block in the main video pipe of VOUT is shown. The primary output circuit 58 generally comprises a block (or circuit) 80, a block (or circuit) 82, a block (or circuit) 84, and a block (or circuit) 86. The block 80 may be implemented as a CSC circuit. The block 82 may be implemented as a GAMMA circuit. The block 84 may be implemented as a DITHER circuit. The block 86 may be implemented as a panel interface circuit. VOUT pixel data may be fetched from the SDRAM circuit 52 and proceed down the main video pipe circuit 54. To gain high controllability of data entering CSEE, all sub-modules (e.g., Y Scaler 60, X2 scaler 62, etc.) in the main video pipe circuit 54 need to be set to a transparent or minimal transform mode. The Y scaler circuit 60 and the X2 scaler circuit 62 may not be bypassed and are set to a 1:1 scaling.

Figure 5:
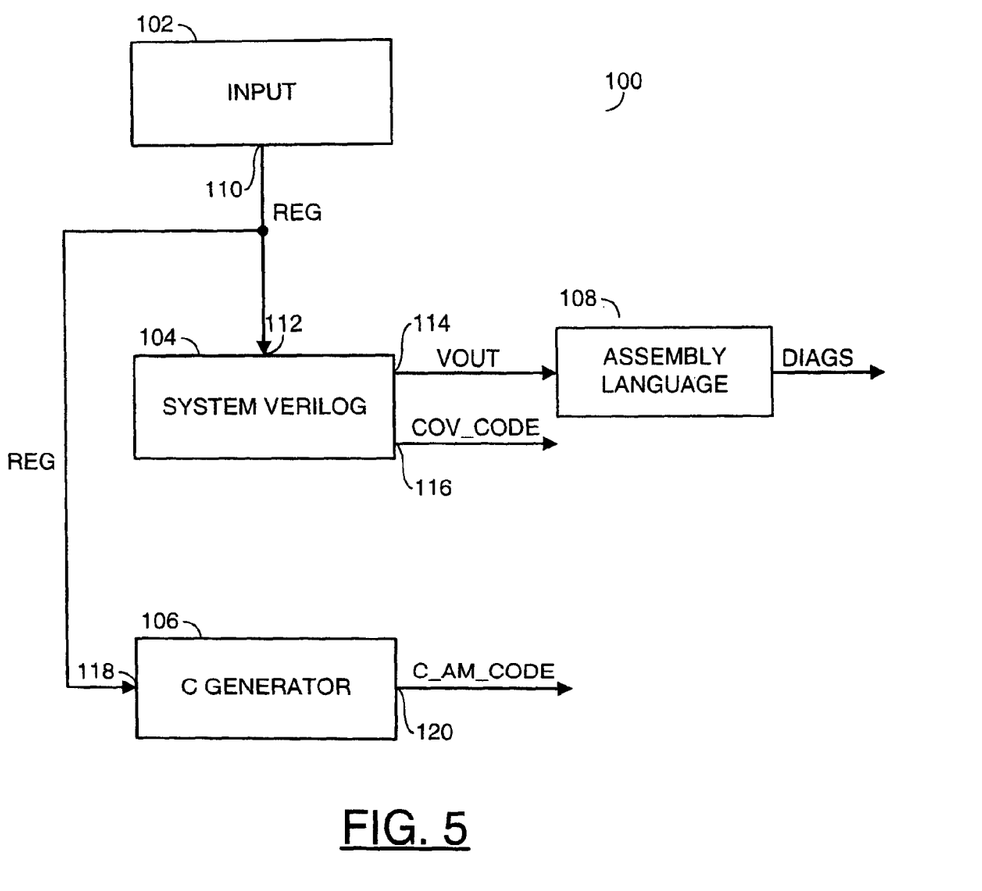
FIG. 5 is a block diagram illustrating a test generation infrastructure.

Referring to FIG. 5, a test generation infrastructure system 100 is shown. The system 100 generally comprises a block 102, a block 104, a block 106 and a block 108. The block 102 may be implemented as an input block. The block 102 may be configured to generate a set of register files (e.g., REG). The block 102 may present the register files REG to an output 110. The block 104 may be implemented as a system verilog block. The block 104 may have an input 112 that may receive the signal REG, an output 114 that may present a signal (e.g., VOUT), and an output 116 that may present a signal (e.g., COV_CODE). The signal VOUT may represent a set of verilog code. The signal COV_CODE may represent a set of coverage code. The signal COV_CODE may be compiled and run with an RTL compiler.

The block 106 may be implemented as a programming code generator (e.g. C, Perl, Pascal, etc.). The block 106 may have an input 118 that may receive the signal REG and an output 120 that may present a signal (e.g., C_AM_CODE). The C code generator 106 may generate the signal C_AM_CODE in response to the signal REG. The signal C_AM_CODE may be used in C reference models. The block 108 may be implemented as an assembly language block. The block 108 may be configured to generate an assembly test language signal (e.g., DIAGS) in response to the signal VOUT.

Figure 6:
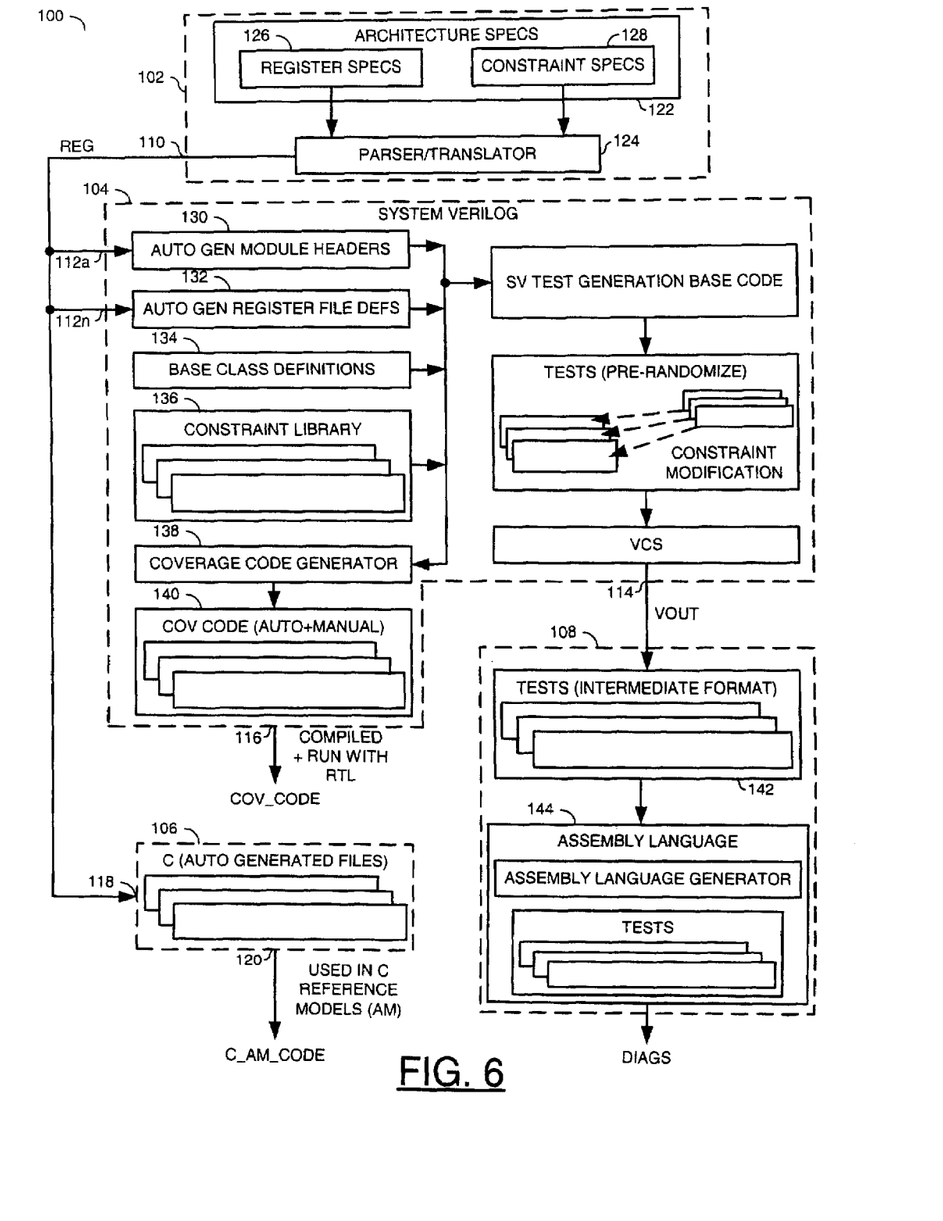
FIG. 6 is a more detailed diagram of the test generation infrastructure.

Referring to FIG. 6, a more detailed diagram of the system 100 is shown. The block 102 may be implemented as a block 122 and a block 124. The block 122 may be implemented as an architecture specification block. The block 124 may be implemented as a parser/translator block. The architecture specification block 122 may comprise a block 126 and a block 128. The block 126 may be implemented as one or more registers configured to store one or more specifications. The block 128 may be implemented as a constraint specification block.

The block 104 generally comprises a block 130, a block 132, a block 134, a block 136, a block 138, and a block 140. The block 130 may be implemented to automatically generate one or more module headers in response to the signal REG. The block 132 may be configured to automatically generate one or more register file headers. The block 134 may be implemented to store one or more base class definitions. The block 136 may be implemented to store a constraint library. The block 138 may be implemented as a coverage code generator. The block 140 may also be implemented as a coverage code generator. The block 140 may present both an automatic and a manual set of coverage codes as the signal COV_CODE.

The block 108 generally comprises a block 142 and a block 144. The block 142 may be implemented as an intermediate tester. The block 144 may be implemented as an assembly language generator. The block 144 may be configured to translate the output of the block 142.

The test generation infrastructure 100 may be partitioned into components at a specification level and at an implementation level. A register definition format may be specified for an architecture specification. The parser/translator 124 may be configured to read text documents (e.g., word or other word processor formats) and automatically create instances of register files for each module. The parser/translator 124 may also be part of an Image/Video subsystem. The base classes 134 for key components of the test generator infrastructure 100 may be written. The base classes 134 may be configured to be common across all modules. Intelligence in terms of system constraints may then be added for each module. Inter-module (i.e., subsystem) and inter-subsystem level constraints may also be added. The test generator infrastructure 100 may be configured to comprehend complex video subsystem level constraints. An intermediate test language 142 may be defined. Register settings as well as data frames may be written out in the intermediate test language 142. For example, a SPARC assembly language translator may be used to write the intermediate test language 142 and/or create a final assembly language test 144. The test generator infrastructure system 100 may provide a unified framework for test generation, where customization for each module or subsystem is reduced to correctly coding system constraints.

In general, the first step in automation may be to specify each register in a predefined format. A number of scenarios for best representing the register definitions may be defined. Initially, a register definition spreadsheet with all the registers may be created. However, the architecture specs 124 may need to specify the registers and may also need a detailed description of the registers. Coherency between the spreadsheet and the architecture specs 122 may be difficult to maintain if changes are made. In the present invention, the register definitions may be implemented as part of the architecture specs 122. Each register may be defined in a table with a keyword at the beginning. The keyword may specify that the register is a register definition. The parser/translator 124 may save the text document as an html file.

TABLE 1

| REG_DEF | | | | | | | |
|---|---|---|---|---|---|---|---|
| Field | VoutReg + 0x01A8 | | | vout_vid_csee_red_edge_enh_3 | | CSEE Red Edge Enhancement Register 3 | |
| Name | Bits | R | R/W | Description | Range | Enumeration | Enumeration Description |
| RSV | 31:7 | | | Reserved | | | |
| a22 | 6:4 | 0 | R/W | Red Digital Filter | 7.6 | 6 | Red filter coefficient = (−2) |
| | | | | 3 × 3 Matrix Coefficient Bottom | 2.0 | | |

TABLE 1-continued

| | | | | REG_DEF | | | |
|---|---|---|---|---|---|---|---|
| Field | VoutReg + 0x01A8 | | | vout_vid_csee_red_edge_enh_3 | | CSEE Red Edge Enhancement Register 3 | |
| Name | Bits | R | R/W | Description | Range | Enumeration | Enumeration Description |
| | | | | Right value | | 7 | Red filter coefficient = (−1) |
| | | | | | | 0 | Red filter coefficient = 0 |
| | | | | | | 1 | Red filter coefficient = 1 |
| | | | | | | 2 | Red filter coefficient = 2 |
| RSVa21 | 3.3 2.0 | 0 | R/W | Reserved Red Digital Filter | 7.6 | 6 | Red filter coefficient = (−2) |
| | | | | 3 × 3 Matrix Coefficient Bottom Middle value | 2.0 | | |
| | | | | | | 7 | Red filter coefficient = (−1) |
| | | | | | | 0 | Red filter coefficient = 0 |
| | | | | | | 1 | Red filter coefficient = 1 |
| | | | | | | 2 | Red filter coefficient = 2 |

The keyword (e.g., REG_DEF) may be used by the parser/translator 124 to identify registers in the architecture specs 122. The other fields in the table header may specify offset with respect to a base address (e.g., Vout_Ref+0x01A8), a unique name for the register (e.g., vout_vid_csee_red_edge_enh_3) and a description of the register. TABLE 1 contains the following information: (a) Field Name (b) Bits (c) Reset Value (d) Read Only or Read and Write (R/W) (e) Description (f) Range (g) Enumeration and (h) Enumeration Description. For a particular control field, each value may specify a certain action and setting for the design. Values and corresponding control or functional information may be explicitly specified.

The base class definitions 134 may encapsulate the lowest level of data structure needed for the test generation infrastructure system 100. In one example, the base class definitions 134 may include: (1) Field, (2) Register, (3) Register File, (4) Sub-module, (5) Module, (6) Sub-System, and (7) System. Software vendors have created various class libraries to help in the verification effort. These class libraries provide various components of a verification methodology. For example, Synopsys has defined reference verification methodology (RVM) and the implementation is encapsulated in a RVM library. Similarly, Mentor has defined advanced verification methodology (AVM) with implementation encapsulated in a AVM library. The present invention may be either vendor dependent or independent. For example, certain base classes from various vendors may be very useful. In another example, a common data logging and display mechanism may normally be included in the typical RVM library.

The base class definitions 134 may include Field, Register and RegFile. A class (e.g. Field) may be the lowest level of hierarchy incorporating members such as addr, data, mask, endposition, startposition, index, width, (rand) val, reset val and name. The class Field may contain both tasks and functions. The key function may initialize the various members based on the values specified in the header file. A class (e.g., Regfile) may contain an array of registers. A number of tasks and functions may also be defined. The functions and tasks may perform a number of actions. For example, a class (e.g., init_reg_file) may populate individual register definitions in the register file by ORing the data from individual fields.

Figure 7:
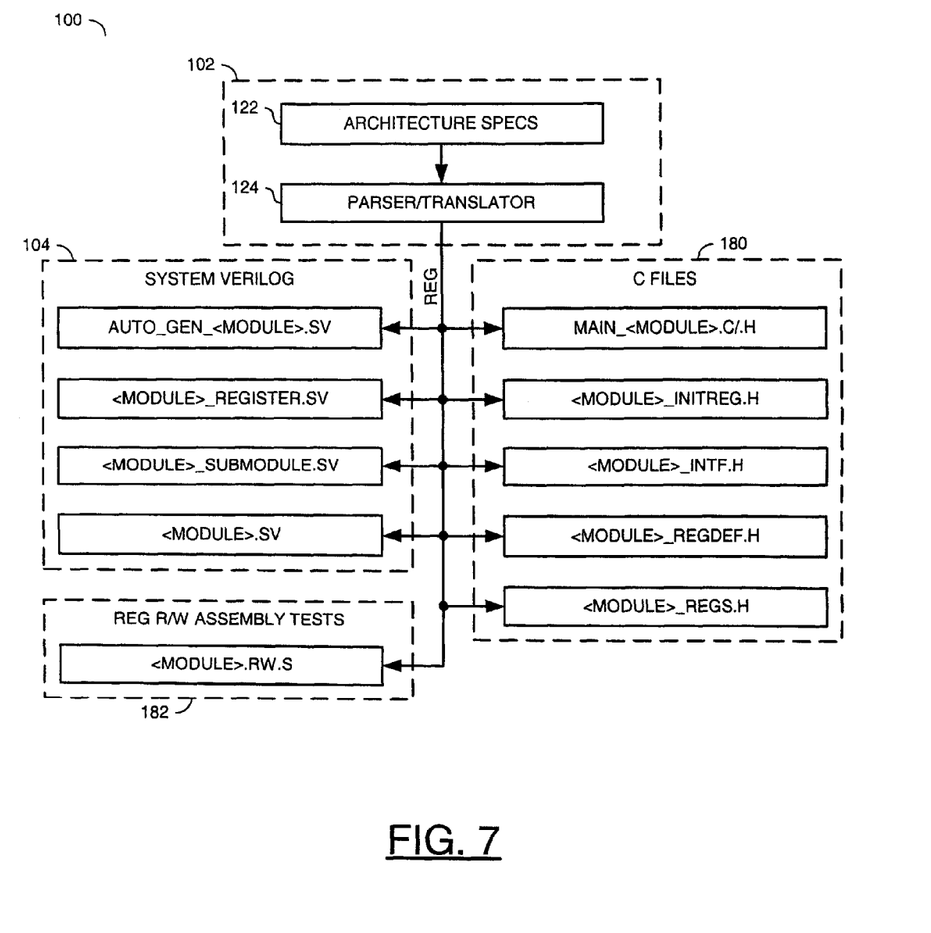
FIG. 7 is a block diagram illustrating files generated by a parser/translator.

Referring to FIG. 7, an alternate representation of the system 100 is shown. The parser/translator 124 may generate System Verilog in the block 124, C language files in a block 180 and assembly language files in a block 182. A set of reference models may be written and integrated in an architecture model (AM). In order to integrate an architecture model, the register definitions and interface routines for the module may need to be written. The parser/translator 124 may automate the process by generating C files. The block 182 may run register read/write (R/W) tests on the RTL to verify register functionality. The parser/translator 124 may automatically generate assembly language tests since the parser/translator 124 has complete register information. The System Verilog 104 may also generate coverage code for field coverage (not shown in FIG. 7). The System Verilog 104 coverage code may serve to automate (i) feature, (ii) cross and (iii) corner case coverage.

The constraint library 136 may include user defined constraints for each sub-module/module. The constraint library 136 may be used as a building block for creating directed and/or random tests. In one example, the features of the constraint library 136 may include BYPASS, BASIC_FUNC, ADV_FUNC, etc. A feature directed test may be defined as a constraint. The feature directed test defined as a constraint may be added to the constraint library 136. A top level test may include enabling appropriate constraints for the sub-modules.

The generation of the constraint library may further include constraining the solution space by a combination of (1) writing new constraints and (2) enabling constraints in the library. In the System Verilog framework, each test may normally be defined as a class which inherits (or extends) a base test. The System Verilog solver may be invoked and register values may be written in an intermediate format. A perl script may also be written to receive the intermediate test file, assembly language header and footer files, a seed and target directory name, and generate the assembly language test.

The following TABLE 2 details statistics for the VOUT module:

TABLE 2

| Module | Constraints | | | Cov Pts | Tests |
| --- | --- | --- | --- | --- | --- |
| | AUTOGEN | SYSTEM | LIBRARY | | |
| Main | 479 | 13 | 768 | 479 | 8 |
| Secondary | 179 | 15 | 274 | 179 | 6 |
| Primary | 120 | 10 | 238 | 120 | 5 |
| OSD | 1088 | 28 | 1563 | 1088 | 6 |
| Still | 1188 | 21 | 1281 | 1188 | 5 |

The columns AUTOGEN, SYSTEM and LIBRARY refer to a number of distinct constraint equations generated automatically from the register definition. The columns AUTOGEN, SYSTEM and LIBRARY may represent system level conditions and may be written as part of the constraint library. The number of coverage points may normally be equal to the number of auto generated constraints. The tests represent the currently written bring-up tests for the respective modules.

The present invention presents a rationale for constraint solving for efficient test generation of systems with a high degree of programmability. The test generation framework may automatically read register definitions from an architecture specification and generate SV constraint code, C code as well as SV coverage code. The present invention may employ powerful capabilities of a System Verilog constraint solver to generate intermediate test files which may be converted to assembly language tests. The auto generated constraints in conjunction with system constraints may be converted into a "C" checker that may be used by software and application teams to check the validity of application tests. The code base may also be easily ported to other projects. In one example, the knowledge base encapsulated in the constraints may be modified for other projects.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method comprising:
    generating a first code;
    applying one or more constraint constructs to said first code;
    generating a coverage code and a second code in response to applying said constraint constructs to said first code;
    generating a third code in response to said first code;
    generating one or more assembly language tests in response to said second code; and
    converting said constraint constructs into a code checker.

2. The method according to claim 1, further comprising the step of:
    generating an intermediate test file.

3. The method according to claim 1, wherein said third code comprises C code used in C reference models.

4. The method according to claim 1, wherein said coverage code is compiled and run with a RTL compiler.

5. The method according to claim 1, wherein said second code comprises a set of verilog code.

6. The method according to claim 1, wherein said coverage code comprises an automatic and a manual set of coverage code.

7. The method according to claim 1, wherein said one or more assembly language tests are written by a SPARC assembly language translator.

8. An apparatus comprising:
    means for generating a first code;
    means for applying one or more constraint constructs to said first code;
    means for generating a coverage code and a second code in response to applying said constraint constructs to said first code;
    means for generating a third code in response to said first code;
    means for generating one or more assembly language tests in response to said second code, wherein said apparatus is configured to process video subsystem level constraints;
    means for converting said constraint constructs into a code checker; and
    circuitry means for storing said one or more assembly language tests.

9. An apparatus comprising:
    a first circuit configured to generate a first code;
    a second circuit configured to (i) apply one or more constraint constructs to said first code and (ii) generate a coverage code and a second code in response to applying said constraint constructs to said first code;
    a third circuit configured to generate a third code in response to said first code;
    a fourth circuit configured to generate one or more assembly language tests in response to said second code, wherein said apparatus is configured to process video subsystem level constraints; and
    a fifth circuit configured to convert said constraint constructs into a code checker.

10. The apparatus according to claim 9, wherein said first circuit comprises (i) a parser/translator and (ii) a set of architecture specifications.

11. The apparatus according to claim 10, wherein said set of architecture specifications includes a set of register specifications and a set of constraint specifications.

12. The apparatus according to claim 10, wherein said parser/translator is configured to (i) read text documents and (ii) automatically create instances of register files.

13. The apparatus according to claim 9, wherein said second circuit is further configured to automatically generate (i) one or more register file headers and (ii) module headers in response to said code.

14. The apparatus according to claim 9, wherein said second circuit is further configured to store one or more base class definitions.

15. The apparatus according to claim 14, wherein said base class definitions include Field, register, Register File, Submodule, Module, Sub-system, and System.

16. The apparatus according to claim 9, wherein said second circuit is further configured to store a constraint library.

17. The apparatus according to claim 9, wherein said coverage code comprises an automatic and a manual set of coverage code.

18. The apparatus according to claim 9, wherein said one or more assembly language tests are written by a SPARC assembly language translator.

* * * * *